Patented Aug. 22, 1950

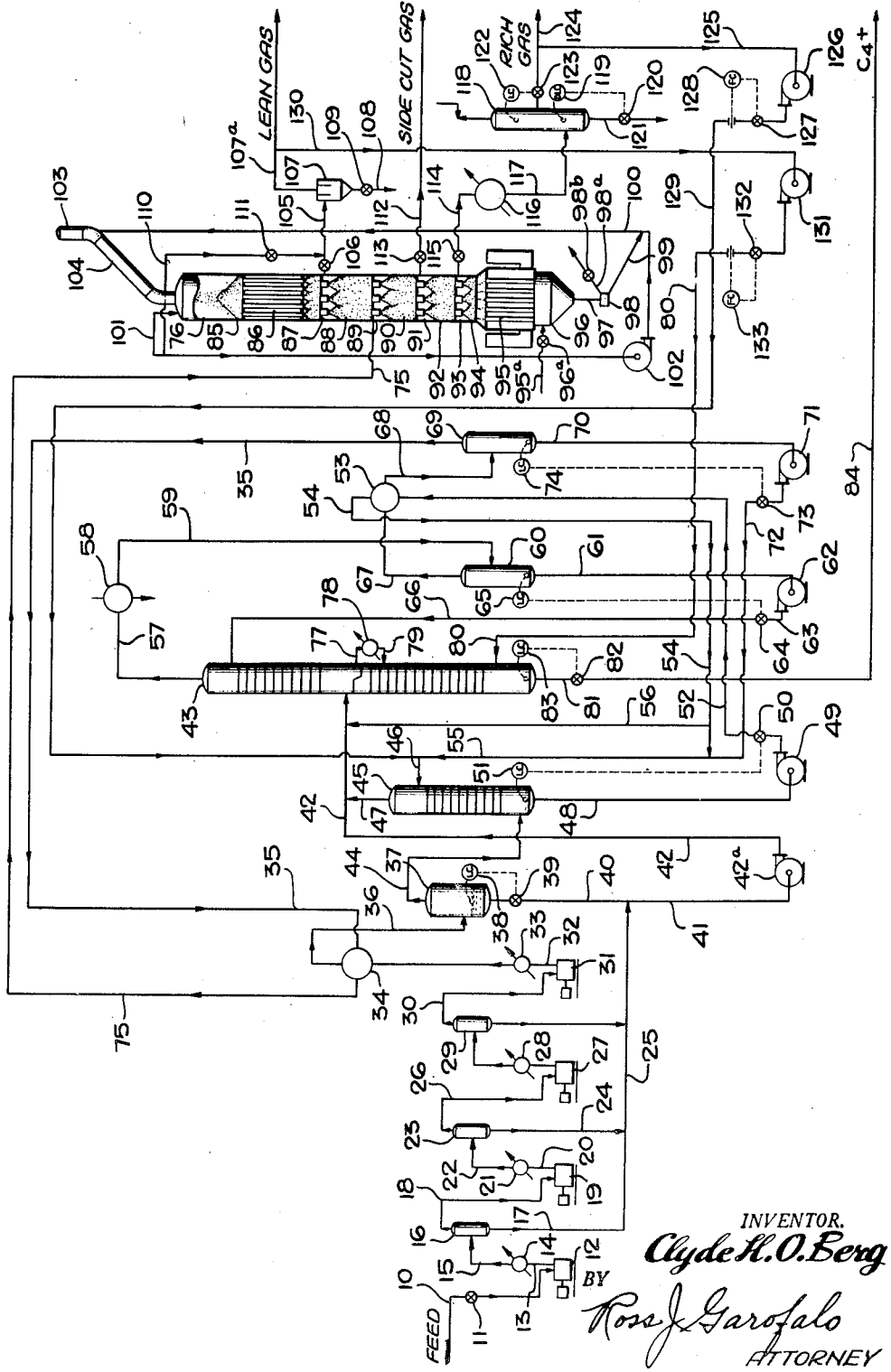

2,519,344

UNITED STATES PATENT OFFICE 2,519,344

ADSORPTION PROCESS

Clyde H. O. Berg, Long Beach, Calif., assignor to Union Oil Company of California, Los Angeles, Calif., a corporation of California Application April 8, 1947, Serial No. 740,202

14 Claims. (Cl. 183—114.2)

This invention relates to the separation of gaseous mixtures into individual constituents or fractions thereof and is particularly adaptable to the separation of gaseous mixtures which contain thermally sensitive constituents. This invention is more particularly adapted to the separation of gaseous mixtures which contain highly unsaturated hydrocarbon constituents which are thermally sensitive by a process which includes the operations of rectified absorption in a low boiling hydrocarbon solvent and selective adsorption of certain constituents of the gaseous mixture on solid adsorbents.

Conventional means for effecting the separation of the component parts of such mixtures include fractional distillation, solvent extraction, selective adsorption and similar processes. In order to effect separations using fractional distillation the gaseous mixture to be treated must first be liquefied by the application of pressure or a reduction in temperature, or both. Difficulties are encountered in applying these processes alone where the gaseous mixture to be treated contains constituents possessing low critical temperatures requiring abnormally low temperatures to cause liquefaction, and oftentimes results in rendering the use of these methods impracticable from either operation or economic standpoints.

Solvent extraction may be applied to the separation of such mixtures and also, by the very nature of the process, requires the preliminary liquefaction of the gaseous mixture to be separated. As in the application of fractional distillation and depending upon the properties of the particular gaseous mixture, such liquefaction may require excessively elevated pressures and perhaps abnormally low temperatures. In the recovery of the particular desirable constituents from the extract, higher temperatures are required in some cases greater than about 180° F. to 200° F. In the case where there are thermally sensitive constituents in the extract such as highly unsaturated hydrocarbons, such temperatures cause thermal polymerization and result in low recoveries. Loss of unsaturated hydrocarbons due to thermal polymerization at temperatures above about 180° F. result is decidedly uneconomical operation because such unsaturated hydrocarbons have considerable value as chemical raw materials.

Gaseous mixtures containing these valuable components are produced in large quantities in many processes, for example, in the thermal or catalytic cracking of hydrocarbon fractions for the production of high grade fuels or the cracking of lower molecular weight hydrocarbon fractions for the production of unsaturated hydrocarbons specifically for use in synthetic organic chemical manufacture. In such processes the hydrocarbon feed stock, such as, for example, gas oil, or the like, is subjected to pyrolysis or cracking by treatment at extreme temperatures at which decomposition is caused, or by contacting with a catalyst at somewhat more moderate temperatures. Following the cracking operation the products thereof are cooled to near atmospheric temperatures causing the formation of a liquid condensate containing the normally liquid hydrocarbons of the product together with some dissolved normally gaseous hydrocarbons and a gaseous phase consisting predominantly of the normally gaseous hydrocarbons and saturated with a certain amount of the normally liquid hydrocarbons.

This gaseous fraction of the cracked or pyrolyzed feed stock generally contains a mixture of hydrocarbons of the aliphatic or saturated series including methane, ethane, propane, butane, isobutane and even pentane and isopentanes together with hydrogen. Also contained therein and characteristic of such cracked gases are the olefinic or unsaturated components which may include acetylene, ethylene, propylene, methyl acetylene, the butylenes and butadiene, and in some cases higher unsaturated hydrocarbons such as the pentenes or amylene and higher diolefins such as pentadiene and cyclopentadiene, and the like. The relative amounts of these higher boiling components present in the gaseous phase depends largely upon the temperature and pressure at which the cracked products, that is to say, the liquid and gas phases, are separated. Recovery of even moderately pure components from such a mixture is difficult and expensive due to the temperature and pressure considerations required in such recoveries, because of its wide boiling range, and other reasons previously mentioned. As a result, such cracked gases are often wasted by venting to the atmosphere or disposed of as low-value fuel gas.

It has been found that such mixtures of cracked gases containing substantial quantities of unsaturated compounds may be more conveniently and more efficiently separated by the application of a modification of the process of selective adsorption on a solid granular adsorbent as hereinafter more clearly described.

In general, the process of separating gaseous mixtures by selective adsorption on granular adsorbents, such as for example, activated charcoal, activated alumina, or silica gel, or the like, involves the steps of contacting countercurrently the gaseous mixture with the adsorbent, preferably in a moving bed. In a moving bed operation the adsorbent, upon which certain of the gaseous components have been adsorbed, flows from the adsorption zone through one or more rectification zones and into a stripping or desorption zone wherein the adsorbed components are caused to be desorbed from the adsorbent by the application of heat and a stripping gas, such as, for example, steam to form a lean adsorbent. The lean adsorbent is subsequently cooled prior to repassage through the adsorption section.

Solid adsorbents generally adsorb certain gases more strongly than others and the process of selective adsorption is based upon this phenomenon. In the case of charcoal as the adsorbent, those hydrocarbon gases having the higher boiling point or higher molecular weight are adsorbed preferentially over those having the lower boiling point or molecular weight. In the non-hydrocarbon gases there appears to be a correlation of adsorption with the critical temperature of the gas, those gases having low critical temperatures like hydrogen and helium being substantially unadsorbed.

More specifically, the selective adsorption process involves the maintenance of a continuous flow of a granular adsorbent through an adsorption column. The adsorption column may consist of a reservoir or hopper for the adsorbent located in the upper portion thereof, a cooling section placed directly beneath, with the adsorption section located directly below the cooling section. One or more rectification sections are located below the adsorption section and a desorption section is located in the lower portion. The flow of granular adsorbent is by gravity from the hopper at the top of the adsorption column through said sections previously named, down through the desorption section and out the bottom thereof. The apparatus is provided with means for lifting the lean charcoal from the lower section of the desorption section to the top of the column and discharging it through a separator into the hopper. Means are also provided for control of the rate of charcoal throughput.

It is the purpose herein to disclose certain improvements in the selective adsorption process when it is applied to the separation of highly unsaturated gaseous hydrocarbons from gaseous mixtures of hydrocarbons. The presence of heavy or normally liquid hydrocarbons has a marked deleterious effect on the adsorbent, these heavy constituents being present in the feed as such or formed from thermal polymerization of those unsaturated or thermally sensitive components of gaseous mixtures in those portions of the adsorption column wherein elevated temperatures are used. These heavy constituents are not easily removed by the conventional low temperature stripping and the accumulation of these constituents will cause a decrease in the adsorption capacity of the adsorbent necessitating their removal by a steam reactivation at temperatures considerably above those normally used in the desorption operation. Many of the individual unsaturated constituents existing in such gaseous mixtures, such as for example, methyl acetylene, butadiene, cyclopentadiene, and the like, are extraordinarily susceptible to such polymerization reactions even at temperatures as low as 200° F. The use of low temperatures is therefore essential from the standpoint of efficient operation in recovering in pure form substantially all of the unsaturated materials should they be desired products and the prevention of the formation of polymers which are in general normally liquid or solid compounds which impair the potential adsorption capacity of the adsorbent.

It is an object of the present invention therefore to provide an improved process and apparatus for the separation of gaseous mixtures which contain thermally sensitive constituents by means of special rectified absorption and selective adsorption of certain constituents present in the gaseous mixture.

It is a further object of the invention to provide an improved separation process and apparatus for the treatment of highly cracked hydrocarbon gases which contain gases having about five carbon atoms or less per molecule, where some of such gases are paraffinic hydrocarbons together with substantial quantities of olefinic or otherwise unsaturated hydrocarbon gases, in such a manner that such low temperatures required do not necessitate excessive refrigeration duties and high temperatures employed do not cause losses of those hydrocarbon gases which are subject to thermal polymerization.

Another object of the invention is to provide a process and apparatus for the resolution of highly unsaturated hydrocarbon gas mixtures obtained in cracking of selected hydrocarbon fractions which are particularly adapted to operate at pressures which are approximately equal to those at which cracking plant gases are produced and thus make effective use of the pressure of the cracking operation.

It is another object of my invention to provide a process for the pretreatment of normally gaseous hydrocarbons which contain highly unsaturated constituents so as to effect the removal of such unsaturated constituents prior to introduction of the gaseous mixture into the selective adsorption apparatus and thereby substantially completely eliminate the detrimental effects of the formation of polymerized substances on the adsorbent used in the selective adsorption process.

Other objects and advantages of my invention will become apparent to those skilled in the art as the description thereof proceeds.

The above contemplated objects of my invention are accomplished by combining with the selective adsorption process for gas fractionation a preliminary rectified absorption process of special design associated together to form an integrated unit which permits the substantially complete separation and recovery of individual constituents or fractions of gaseous mixtures which contain certain amounts of constituents which are thermally sensitive.

In the process of selective adsorption which I have previously proposed a normally gaseous mixture containing for example, hydrogen, methane, ethylene, ethane, propylene, propane, and $C_4$ hydrocarbons may be divided into two or more fractions containing substantially pure constituents of the gaseous mixture. The separation of gaseous mixtures more highly unsaturated than the mixture cited above, that is to say, a gaseous mixture containing substantial amounts of constituents which are more unsaturated than ethylene and therefore thermally sensitive and subject to thermal polymerization, may be efficiently and conveniently recovered in pure form by employing the methods and apparatus of the present invention.

Briefly my invention comprises a process which combines a special rectified absorption operation and a selective adsorption operation to accomplish an efficient separation of thermally sensitive gaseous mixtures and which process is especially applicable to the separation of thermally sensitive hydrocarbon gases which contain olefinic or otherwise unsaturated constituents. My invention in addition comprises an apparatus which is particularly adapted to perform the aforementioned process.

The process according to my invention which is particularly applicable to the separation of unsaturated gaseous hydrocarbon mixtures obtained in cracking operations comprises compressing the gaseous mixture to a pretreatment pressure which is dictated by the characteristics of the gaseous mixture to be separated. The gas compression is carried out preferably in a multistage gas compressor equipped with interstage cooling facilities and which is capable of compressing a gas to pressures in the range of from 100 to 500 pounds per square inch absolute so that at no point in the compressor does the gas exist at a temperature greater than about 200° F. Generally on compression the higher molecular weight constituents of such hydrocarbon gases condense and are removed as they are formed. The compressed gas thus formed is mixed with a recycle stream of selected constituents separated in the process from the gaseous mixture to form the feed which is fractionated in a rectified absorber. According to my invention the rectified absorber is operated at a sufficiently high pressure so as to render at least a portion of the gaseous mixture removed as an overhead fraction liquefiable at a temperature above the normal freezing point of water of 32° F. The overhead fraction obtained from the rectified absorber and which contains the lower boiling constituents of feed is subsequently introduced into a selective adsorption unit and is separated into a plurality of fractions. A portion of the lean gas separated by the selective adsorption unit is utilized in the rectified absorber as a stripping agent and a portion of the rich gas produced from the selective adsorber is employed as a recycle stream which when combined with the gaseous mixture to be separated forms the feed to the rectified absorber. A second recycle stream, containing constituents present in the rich gas, is utilized in conjunction with the recycle stream which forms the rectified absorber feed so as to refrigerate the rectified absorber and make efficient use of such refrigeration as is required in the process. The particular modification of the selective adsorption process which is employed in conjunction with the rectified absorption process depends largely upon the character of the gaseous mixture to be separated and also upon the purity and the property of the desired products. A plurality of substantially completely pure constituents of the gaseous mixture may be prepared, or a number of fractions with varying average molecular weights may be produced by proper operation of the selective adsorber employed.

The separation process according to my invention is particularly adapted to the resolution of gaseous mixtures produced in high temperature gas-oil cracking and is also applicable with certain modifications of the refrigeration system as hereinafter more fully described to the separation of the thermally sensitive unsaturated product gases formed in hydrocarbon gas cracking as exemplified by the process of propane pyrolysis. The process of the present invention is furthermore applicable in general to the separation of non-hydrocarbon gases which, as previously mentioned, contain particular constituents to which elevated temperatures are detrimental.

The process and apparatus of my invention may be more fully understood by reference to the accompanying illustration wherein is shown a schematic flow diagram of the apparatus adapted to carry out separations of gaseous mixtures according to the principles and methods of the present disclosure.

For purposes of greater clarity, a modification of the process and apparatus of my invention will be described which is particularly adapted to the separation of a gaseous mixture of hydrocarbons produced in the thermal cracking of a selected hydrocarbon fraction. The particular gaseous mixture as descirbed here is not to be taken as limiting my invention, but only descriptive of one modification thereof.

Referring to the figure which represents a general flow diagram of the apparatus adapted to carry out the process of my invention, the gaseous mixture of hydrocarbons has the following composition:

| Constituent: | Mol per cent |
|---|---|
| Hydrogen | 13.8 |
| Methane | 30.0 |
| Ethylene | 19.8 |
| Ethane | 5.9 |
| Propylene | 11.8 |
| Propane | 1.3 |
| Butadiene | 1.2 |
| Butenes | 4.4 |
| Butanes | 0.7 |
| Pentanes, and heavier | 11.1 |
| Total | 100.0 |

The feed is processed at a rate of 2640 MSCF/D (one MSCF/D is equal to 1000 standard cubic feet of feed per day) which is equivalent to about 248 mols per hour and is introduced into the system by means of line 10 controlled by valve 11 into the first stage 12 of the multistage compressor. The gas is compressed and heated somewhat therein and conducted through line 13 to first stage intercooler 14, wherein the compressed gas is cooled and a small amount of condensate forms. The condensate and cooled compressed gas is conducted by means of line 15 to separator 16, from which the condensate is removed by means of line 17. The dry gas is removed by means of line 18 and introduced into second stage 19 of the multistage compressor. By careful choice of the pressure increase in each stage of the multistage compressor, the temperature rise of the gas under compression may be limited to a value at which polymerization losses are not serious. For cracked hydrocarbon gases this maximum temperature is in the range of from 175° F. to 200° F., and for other thermally sensitive gases the temperature varies. For any particular mixture of such gases the pressure increase in each stage of compression should be limited so as not to exceed a given maximum temperature. The compressed gas removed from second stage 19 is conducted by means of line 20 and introduced into second interstage cooler 21 and the cooled compressed gas and any condensate formed are conducted by means of line 22 to separator 23 wherefrom the condensate is removed by means of line 24 and joined in header 25 with condensate removed from separator 16.

Compressed gas from the second stage 19 of the multistage compressor is removed from separator 23 by means of line 26 and is introduced into third stage 27 of the multistage compressor. This stage is provided with third stage intercooler 28, separator 29, which perform in an entirely analogous manner to previous stages, intercoolers and separators. The condensate removed from the three separators 16, 23, and 29 are joined in header 25 and the cooled gas from separator 29 is introduced by means of line 30 into fourth stage 31 wherein it is raised to the final operating pressure. The compressed gas, at a final pressure of about 320 pounds per square inch gauge, is removed from fourth stage 31 by means of line 32 and is introduced into fourth stage intercooler 33 wherein the gas is cooled to a temperature of 105° F. The cooled gas is interchanged in heat interchanger 34 with the selective adsorber feed flowing through line 35 thereby cooling the compressed gas from 105° F. to about 65° F. and warming the selective adsorber feed from about 40° F. to about 75° F. In cooling the compressed gas to 65° F. condensate forms at a rate of about 47 mols per hour and is introduced by means of line 36 into condensate separator 37. The level controller 38 actuates valve 39 which controls the rate at which condensate is removed from separator 37. The condensate thus removed is introduced into line 40 wherein it is combined with the compressor condensate carried in line 25. The total amount of condensate, amounting to more than 47 mols per hour is conducted by means of line 41 and line 42 under positive pressure exerted by pump 42a and is introduced into rectified absorption column 43 which has about 40 bubble trays provided for efficient contacting of the gases and liquids. The gas separated from separator 37 flows at a rate of 200 mols per hour through line 44 and is introduced into the lower portion of absorber 45. Absorber 45 consists of a bubble-tray type absorption contactor having about ten bubble trays. The gas introduced into the bottom of absorber 45 by means of line 44 contains substantial amounts of $C_2$ and lighter hydrocarbons together with a small amount of the $C_3$ hydrocarbons. The condensate removed from separator 37 contains the remaining portion of the $C_3$ hydrocarbons together with the $C_4$ and $C_5$, and heavier hydrocarbons together with a small amount of the $C_2$ hydrocarbons. A liquid hydrocarbon mixture which consists of substantially completely $C_3$ hydrocarbons and which comprises a portion of the rich gas produced from the selective absorber, as hereinafter more fully described, is introduced into absorber 45 by means of line 46 and flows downward through absorber 45 countercurrent to the gases rising therethrough. The liquid $C_3$ hydrocarbons introduced, as indicated, into absorber 45 serves by partial evaporation and warming of the liquid $C_3$ hydrocarbons to cool the upwardly rising gases passing therethrough so that 273.5 mols per day of a mixture of $C_3$ and lighter hydrocarbons in gaseous form are removed from absorber 45 by means of line 47 at a temperature of 45° F. and are combined with the enriched feed flowing through line 42 to form a combined feed which is introduced into rectified absorber 43. The stream of liquid $C_3$ hydrocarbons introduced at a rate of about 1820 mols per hour into absorber 45 by means of line 46 flow downwardly through absorber 45, evaporating during passage therethrough about 73 mols per hour of propane. The liquid removed from the bottom of absorber 45 at a temperature of 35° F. by means of line 48 flows at a rate of 1750 mols per hour under positive pressure exerted by pump 49 controlled by valve 50 actuated by level controller 51 and is conducted by means of line 52 to interchanger 53 wherein it is indirectly contacted by the feed gas to the selective adsorber, thereby increasing the temperature of the liquid from 35° F. to 45° F. The $C_3$ hydrocarbon recycle is removed at a temperature of 45° F. from heat interchanger 53 by means of line 54 and returned by means of line 55 which joins with line 46 and is reintroduced into absorber 45. In passage of the propane recycle stream through absorber 45, hydrocarbon constituents of the feed of molecular weight higher than propane are absorbed. About 53 mols per hour of the recycle stream is bled from line 54 by means of line 56 and combined with the liquid flowing through line 42 and the mixture is introduced into rectified absorber 43 as the combined feed. The depletion of 53 mols per hour from the recycled stream is replenished from the liquid obtained from the overhead fraction removed from absorber 43. The overhead fraction is removed from rectified absorber 43 by means of line 57 and is introduced into reflux condenser 58 where it is cooled to a temperature of about 53° F. by means of a refrigerant which enters at 40° F. and leaves at 46° F. An overhead fraction condensate is formed in reflux condenser 58 and removed therefrom by means of line 59 and introduced into reflux accumulator 60. The liquid thus formed is removed from accumulator 60 by means of line 61 under positive pressure exerted by pump 62 and introduced by means of line 63 controlled by valve 64 actuated by level controller 65 and conveyed through line 66 and introduced into the upper portion of rectified absorber 43 as reflux. The noncondensable gas separated from the liquid in reflux accumulator 60 is removed therefrom by means of line 67 and is introduced into heat interchanger 53 wherein the gas is cooled from a temperature of 55° F. to 40° F. by indirect heat exchange with the liquid removed from the bottom of absorber 45 as previously described. Additional condensate is formed in interchanger 53 and the cooled gas and condensate are removed therefrom by means of line 68 and is introduced into separator 69. The condensate removed from the bottom of separator 69 at a rate of 53 mols per hour by means of line 70 is pumped by means of pump 71 through line 72 controlled by valve 73 actuated by level controller 74 and is combined with the $C_3$ hydrocarbon recycle in line 55 as previously mentioned and is introduced by means of line 46 into absorber 45. A noncondensable gas is removed from separator 69 by means of line 35 at a rate of about 305 mols per hour and at a temperature of 40° F. which contains certain amounts of $C_3$ hydrocarbons together with substantially completely all of the $C_2$ hydrocarbons, $C_1$ hydrocarbon, and hydrogen present in the feed. The gas thus removed is conveyed by means of line 35 to heat interchanger 34 previously described wherein the gas is warmed from a temperature of 40° F. to about 75° F. and is removed from interchanger 34 and is introduced by means of line 75 into selective adsorber 76.

In the upper portion of rectified absorber 43, the $C_3$ hydrocarbon reflux introduced thereinto as a solvent by means of line 66 flows downward countercurrent to the upwardly rising gases absorbing therefrom substantially completely all of the C₄ and heavier hydrocarbons thereby forming a rich solvent. The rich solvent thus formed flows downwardly into the lower portion of rectified absorber 43 from which a portion of the rich solvent is removed through line 77 and passed through heater 78. The heated liquid and any vapor thus formed is returned to the lower portion of rectified absorber 43 by means of line 79. Careful control of heater 78 is necessary in order to avoid temperatures greater than about 200° F. because of the fact that above this temperature highly unsaturated hydrocarbons are rapidly polymerized. The rich solvent thus heated flows downwardly through the lower portion of rectified absorber 43 and is countercurrently contacted therein with a stream of hydrogen and C₁ hydrocarbon introduced by means of line 80 into the lowest portion of rectified absorber 43. This stream serves as a stripping gas in removing from the rich solvent substantially completely all of the C₃ hydrocarbons which then pass upwardly through rectified absorber 43 as a gas and are removed together with the C₂ and C₁ hydrocarbons and hydrogen constituents of the combined feed introduced into rectified absorber 43. The C₄ and C₅ hydrocarbons, which accumulate in the lower portion of absorber 43 and which contain only very small amounts of the C₃ hydrocarbon solvent, are removed therefrom by means of line 81 controlled by valve 82 actuated by level controller 83 and are separated from the system through line 84 substantially completely free of C₃ and lighter hydrocarbon constituents. It is this hydrocarbon stream in the particular case at hand which contains the higher molecular weight unsaturated hydrocarbons which are most susceptible to thermal polymerization.

Selective adsorber 76 comprises a vertical column which is provided in successive downward relationship with hopper 85, a cooling zone 86, a lean gas disengaging zone 87, an adsorption zone 88, a feed gas engaging zone 89, a primary rectification zone 90, a side cut gas disengaging zone 91, a secondary rectification zone 92, a rich gas disengaging zone 93, a steaming zone 94, a desorption zone 95, an adsorbent flow controlling zone 96, and a sealing leg zone 97, a continuous downward flow of a solid granular adsorbent is maintained by gravity downwardly through the above-mentioned zones and flows through adsorbent control valve 98 and transfer line 99 into adsorbent lift line 100. For purposes of clear description, the adsorbent will be considered to be activated charcoal which is applicable to the specific separation used in this illustration. The charcoal introduced by means of transfer line 99 into lift line 100 is formed into a lean gas suspension with lean gas withdrawn from the uppermost portion of selective adsorber 76 by means of line 101 and is lifted under pressure exerted by lift gas blower 102 through lift line 100 to separator 103 situated above the uppermost portion of selective adsorber 76. Separator 103 provides an increased cross sectional area for gas flow and the charcoal granules in the charcoal-lean gas suspension settle out and the separated charcoal flows downwardly through transfer line 104 into charcoal hopper 85. The rate of charcoal flowing downwardly through selective adsorber 76 is controlled by a positive metering mechanism situated in charcoal flow controlling zone 96 directly below desorption zone 95 and an absolute control over the rate of flow of charcoal through selective adsorber 76, through sealing leg zone 97, transfer line 99, and into lift line 100 is achieved.

This particular modification of selective adsorption apparatus permits the separation of a feed gas into a first fraction comprising a lean gas containing that constituent or those constituents which are the least readily adsorbable on the charcoal, a second fraction comprising a side cut gas containing constituents which are of intermediate adsorbability on the charcoal and a third fraction comprising a rich gas containing constituents of highest adsorbility.

The feed gas to the selective adsorption column 76 comprises about 305 mols per hour of a gas containing hydrogen, C₁ hydrocarbon, C₂ hydrocarbons and C₃ hydrocarbons. The molar feed rate of 305 mols per hour is equivalent to a gaseous feed rate of about 2640 MSCF/D and in order to accomplish the desired separation an activated charcoal rate of 320 pounds per MSCF of feed gas is required. This charcoal-feed gas ratio corresponds to a charcoal circulation rate of 17.6 tons per hour. The diameter of selective adsorber 76 required to handle the aforementioned amounts of feed gas and charcoal is 4.0 feet.

The feed gas is introduced at a pressure of about 300 pounds per square inch gauge and at a temperature of about 75° F. into feed gas engaging zone 89 by means of line 75. Feed gas engaging section 89 is similar in construction to all engaging and disengaging sections in selective adsorber 76 in that they comprise a horizontal tray filling the entire cross sectional area of the adsorber and each is equipped with a series of tubes which are attached to and extend downward from each tray. A free space is thus formed which facilitates introduction and removal of gases. The feed gas passes upwardly through adsorption zone 88 countercurrently to the downwardly flowing charcoal which adsorbs on its surface substantially all of the C₃ and C₂ hydrocarbons together with a small portion of the C₁ hydrocarbon and hydrogen. The remainder of the C₁ hydrocarbon and hydrogen continues the upward passage through adsorption zone 88 into lean gas disengaging zone 87 from which a portion of the lean gas is removed by means of line 105 controlled by valve 106 and is introduced into separator 107. In separator 107 traces of suspended charcoal fines are removed from the lean gas stream and the thus removed charcoal fines are removed from separator 107 by means of line 108 controlled by valve 109. The lean gas, consisting of substantially completely pure C₁ hydrocarbon and hydrogen, is removed from separator 107 by means of line 107a at a rate of about 1360 MSCF/D. The remaining portion of the lean gas passes upward through tubular cooling zone 86, through charcoal hopper 85 and is removed from the upper portion of selective adsorber 76 by means of line 101 which functions as the lift gas return line carrying lean gas which circulates and serves to lift the lean charcoal discharged from the bottom of selective adsorber 76 and return it to the top of the adsorber. Line 110 is provided to remove from line 101 an accumulation therein of lean gas equal in amount to that which passes upwardly through a cooling zone 86. Line 110 provides an outlet for about 35 mol per cent of the lean gas production and is controlled by valve 111 and discharges into line 105 on the low pressure side of valve 106 thereby combining all lean gas produced from selective adsorber 76. The upflow of lean gas through cooling zone 86 serves to remove adsorbed water vapor from the charcoal which, if it were allowed to accumulate, would effectively alter the flow characteristics of the granular charcoal. The upflow of lean gas also serves to substantially completely saturate the cooled charcoal flowing from the bottom of cooling zone 86 with $C_1$ hydrocarbon and hydrogen thereby increasing the capacity of the charcoal in adsorption zone 88 to adsorb the $C_2$ and $C_3$ hydrocarbons.

The charcoal leaving adsorption zone 88 is substantially completely saturated with $C_2$ and $C_3$ hydrocarbons and contains a small amount of adsorbed $C_1$ hydrocarbon and hydrogen. This rich charcoal flows downwardly through feed gas engaging zone 89 into primary rectification zone 90 wherein it is countercurrently contacted with a reflux stream containing a high concentration of $C_2$ hydrocarbons which are preferentially adsorbed by the rich charcoal thereby causing the desorption from the rich charcoal of the small amount of $C_1$ hydrocarbon and hydrogen. The liberated constituents flow upwardly countercurrent to the downwardly flowing charcoal and progress through feed gas engaging zone 89 and re-enter adsorption zone 88 for readsorption. The charcoal in the lower portion of primary rectification zone 90 is substantially completely free from $C_1$ hydrocarbon and hydrogen and is saturated with $C_2$ and $C_3$ hydrocarbons. This enriched charcoal flows downwardly through side cut disengaging zone 91 into secondary rectification zone 92 wherein the enriched charcoal is contacted with a countercurrent reflux stream containing a high concentration of $C_3$ hydrocarbons. The $C_3$ hydrocarbons are preferentially adsorbed on the charcoal and serve to effect the substantially complete desorption of the adsorbed $C_2$ hydrocarbons from the rich charcoal forming a rectified charcoal containing the $C_3$ hydrocarbons. The thus desorbed $C_2$ hydrocarbons pass upwardly through secondary rectification zone 92 and enter side cut disengaging zone 91. A portion of the desorbed $C_2$ hydrocarbons flow upwardly through disengaging zone 91 and serve as the previously mentioned $C_2$ reflux stream in primary rectification zone 90. The remaining portion of the desorbed $C_2$ hydrocarbons are removed from side cut disengaging zone 91 by means of line 112, controlled by valve 113 and are removed from the system as an ethylene-ethane concentrate at a rate of about 870 MSCF/D and containing about 75 volume per cent ethylene.

The rectified charcoal present in the lower portion of secondary rectification zone 92 passes downwardly through rich gas disengaging zone 93 into steaming zone 94 wherein the rectified charcoal is contacted by a countercurrent stream of a stripping gas such as for example, steam. The characteristics of some solid adsorbents are such that they exhibit a preferential adsorption under certain conditions for water or water vapor in preference to the hydrocarbon gases being separated and thus in steaming zone 94 the $C_3$ hydrocarbons present on the rectified charcoal are desorbed and move upwardly into rich gas disengaging zone 93. A portion of the thus desorbed $C_3$ hydrocarbons passes upwardly through rich gas disengaging zone 93 into secondary rectification zone 92 wherein it serves as the reflux stream previously mentioned while the remaining portion of the thus desorbed $C_3$ hydrocarbons are removed from rich gas disengaging zone 93 by means of line 114 controlled by valve 115 and is introduced into rich gas condenser 116. In rich gas condenser 116, the condensation of the rich gas together with any of the stripping steam which may accompany it is accomplished and the condensate thus formed is removed from condenser 116 by means of line 117 and is introduced into separator 118. Separator 118 is provided near its lower extremity with differential level controller 119 which actuates valve 120 which in turn controls the flow through line 121 serving as a means for the removal of condensed water from separator 118. The $C_3$ hydrocarbons present in high concentration in the rich gas also condenses under the pressure of operation and settles in separator 118 as a supernatant immiscible liquid phase of lower density than that of the steam condensed, and level controller 122 is provided to regulate the level of the liquefied rich gas therein. Level controller 122 actuates valve 123 which in turn controls the flow of liquid $C_3$ hydrocarbons from separator 118 which are removed via line 124 at a rate equivalent to 410 MSCF/D. This fraction contains approximately 90 volume per cent propylene, and 10 volume per cent propane.

The rectified charcoal in the lower portion of steaming zone 94 which is substantially completely saturated with the stripping gas and containing only small amounts of adsorbed $C_3$ hydrocarbons, flows downwardly from steaming zone 94 into desorption zone 95 wherein it is heated in indirect heat exchange and countercurrently contacted with a stream of stripping agent such as for example steam. The charcoal is heated in the lower portion of adsorption zone 95 to a temperature which depends generally upon operation pressure and feed gas characteristics but for this case is between about 550° F. and 600° F. serving to completely remove from the charcoal the adsorbed steam which was adsorbed thereon in steaming zone 94. The thus desorbed steam travels upwardly through desorption zone 95 and returns to steaming zone 94 serving again to effect the adsorption therein of $C_3$ hydrocarbons adsorbed on the rectified charcoal. The rich gas removed from rich gas disengaging zone 93 contains a small amount of steam which must be made up to maintain effective desorption in desorption zone 95. Make-up amounts of steam at 330 pounds per square inch pressure are added by means of line 95a, controlled by valve 96a into charcoal flow controller zone 96 at a point just below desorption zone 95. The function of sealing leg 97 is to effectively prevent the flow of steam downward through charcoal control valve 98 and transfer line 99 into lift line 100. Line 98a controlled by valve 98b is provided from charcoal valve 98 to allow a certain portion of the lean gas used in lift line 100 to flow upwardly through transfer line 99 and join in charcoal valve 98 with a small amount of steam which passes downwardly through sealing leg 97. The amount of flow through line 98a is small and serves only to maintain an upward flow of lean gas through transfer line 99 to prevent steam entering lift line 100.

A certain amount of the liquefied $C_3$ hydrocarbons produced as a rich gas, as previously described, is returned as a recycle stream to absorber 45 in order to serve therein as a cooling agent for the feed introduced into absorber 45. The recycle stream also serves as an extracting solvent for the $C_4$ and higher molecular weight hydrocarbons present in the gaseous hydrocarbon stream introduced into absorber 45 by means of line 44. This recycle stream for the present feed being separated is equavilent to about 600 MSCF/D and is removed from line 124 by means of line 125 under positive pressure exerted by pump 126 controlled by valve 127 which is actuated by flow controller 128 and is conducted to the upper portion of absorber 45 by means of line 129.

As previously described, a certain portion of the lean gas is used as a stripping agent for removal of $C_3$ hydrocarbon solvent from the rich solvent flowing downwardly through the lower portion of rectified adsorber 43. This lean gas recycle amounts to about 300 MSCF/D and is removed from lean gas line 107a by means of line 130 under positive pressure exerted by compressor 131, controlled by valve 132 which is in turn actuated by valve 133 and the thus compressed lean gas is recycled through line 80 to the lower portion of rectified absorber 43.

It is apparent that the rectified absorber and the selective adsorber operating together provides an unusually efficient apparatus for performing the process for the separation of thermally sensitive gaseous mixtures according to my invention. The selective adsorber previously described permits the preparation of a $C_3$ rich gas stream of better than 97% purity and a side cut gas stream containing about 75% ethylene, although containing small amounts of contaminating $C_1$ and $C_3$ hydrocarbons. By substituting various modifications of the apparatus which I have previously proposed for carrying out the selective adsorption process such as previously described, a side cut gas of substantially higher purity may be prepared and in place of the side cut produced in the previously described example in place of the ethylene concentrate containing 75% ethylene as in the previously described example a side cut gas containing substantially increased amounts of ethylene may be prepared as a $C_2$ hydrocarbon concentrate which contains virtually no $C_1$ or $C_3$ hydrocarbons and 98 to 99 per cent by volume $C_2$ hydrocarbons.

The charcoal employed in the above process is preferably granular, about 10 to 14 mesh although granules as large as about four mesh and as small as about 100 or smaller may be employed in specific instances. The term charcoal used in the foregoing description is meant to include any animal, vegetable, or mineral carbon, the preferable form being an activated vegetable charcoal such as that prepared from coconut hulls or fruit pits.

The length of life of the charcoal, that is, the duration of time in which the adsorbent exhibits its normal adsorption capacity, depends largely upon the nature of the components present in the gaseous mixture introduced into the selective adsorber. The life of charcoal or other applicable adsorbent suitable in the selective adsorption process has been found to be increased by the efficient co-functioning of the associated rectified absorption column previously described which serves effectively to remove the higher molecular weight unsaturated hydrocarbons which are subject to thermal polymerization and would otherwise polymerize and contaminate the charcoal so as to decrease its adsorption capacity. In normal operation of the selective adsorber, a small amount, that it, between less than about 5 and 15 weight per cent of the charcoal flow rate through the selective adsorber, is removed and subjected to a high temperature steam reactivation. Such an operation is generally conducted in a tubular heater connected in parallel with the charcoal adsorber; however, such a tubular heater is not shown in the accompanying drawing.

It is to be understood, however, that the specific separation used herein with the description of the accompanying drawing has been used only for purposes of permitting greater clarity in the description of the drawing and that my invention is applicable to advantage in the separation of many other gaseous mixtures which contain constituents which are thermally sensitive whether this sensitivity be due to a tendency toward thermal polymerization or decomposition or other reasons.

A modification exists in the manner in which the granular adsorbent is conveyed from the bottom of the selective adsorber to the top thereof in which bucket elevators are applicable. In some instances such as for example at the lower pressures the use of elevators to transport the adsorbent are of advantage but in general the use of the gas lift system shown in the drawing described in the description thereof is to be preferred.

It is to be understood that the present invention resides primarily in an improved process and apparatus for the treatment of gaseous mixtures which are thermally sensitive, which process includes a rectified absorber and a selective adsorber of special design. Thus, modifications may be made in the particular method in which the adsorption, pretreatment, or subsequent treatment is carried out without departing from the basic invention herein disclosed.

In addition, and especially with reference to the selective adsorber previously described, I do not wish to be limited by the particular adsorbent named in the description because the apparatus of my invention performs equally as well with all other solid granular adsorbents such as for example silica gel, activated alumina, various adsorbent formed from iron and chromium oxides, and others, as it does with charcoal, and my invention is therefore independent of the type or character of the adsorbent used.

Having described and illustrated my invention and realizing that many modifications thereof will occur to those skilled in the art without departing from the spirit and scope of the following claims, I claim:

1. A continuous process for the separation of hydrocarbon mixtures which contain hydrogen together with saturated and thermally sensitive unsaturated hydrocarbons having not more than above five carbon atoms per molecule which comprises compressing said hydrocarbon mixture to a pressure between about 100 and 500 pounds per square inch absolute, introducing the thus compressed hydrocarbon mixture into an absorption zone, contacting therein the hydrocarbon mixture with a cold liquid stream of $C_3$ hydrocarbons thereby cooling said hydrocarbon mixture and forming an enriched feed containing hydrogen, $C_1$, $C_2$, and $C_3$ hydrocarbons and a rich solvent containing $C_3$, $C_4$, and $C_5$ hydrocarbons, removing said rich solvent from said absorption zone, removing said enriched feed from said absorption zone, combining a portion of said rich solvent with said enriched feed to form a combined feed, introducing said combined feed into a rectified absorption zone, countercurrently contacting said combined feed therein with a liquid reflux containing predominantly $C_3$ hydrocarbons, removing a portion of the liquid flowing downwardly through said rectified absorption zone, heating the thus withdrawn liquid to a temperature less than 200° F. and returning the heated liquid to said rectified absorption zone, countercurrently contacting the heated liquid flowing downwardly through said rectified absorption zone with a stripping gas containing hydrogen and $C_1$ hydrocarbon thereby removing from said liquid the $C_3$ hydrocarbons dissolved therein, removing from said rectified absorption zone a bottoms fraction containing predominantly said thermally sensitive unsaturated $C_4$ and $C_5$ hydrocarbons which is substantially completely free of $C_3$ and lower molecular weight hydrocarbons, removing from said rectified absorption zone an overhead fraction comprising hydrogen, $C_1$, $C_2$, and $C_3$ hydrocarbons, condensing a portion of the thus removed overhead fraction to form a condensed portion containing predominantly $C_3$ hydrocarbons together with some $C_2$ hydrocarbons and an uncondensed portion containing predominantly hydrogen, $C_1$ and $C_2$ hydrocarbons together with some $C_3$ hydrocarbons, returning said condensed portion to said rectified absorption zone to serve as reflux therein separating and liquefying a portion of the $C_3$ hydrocarbons in said uncondensed portion from the lighter gases, recycling the liquefied $C_3$ to the absorption zone as said cold liquid stream, and returning at least a part of said lighter gases to the lower portion of said rectified absorption zone to serve therein as said stripping gas.

2. A continuous process for the separation of normally gaseous mixtures which contain thermally sensitive constituents into four fractions of relatively low, intermediate, higher, and highest molecular weight respectively, which comprises combining said gaseous mixture with a portion of the third fraction as a liquid stream of constituents of higher molecular weight to form a combined feed, introducing said combined feed into a rectified absorption zone, contacting the thus introduced combined feed in the lower portion of said rectified absorption zone with a portion of the first fraction as a stripping gas, contacting the combined feed in the upper part of said liquefied absorption zone with a liquid reflux, removing from said rectified absorption zone an overhead fraction containing constituents of low, intermediate, and higher molecular weight, condensing a portion of said overhead fraction to act as said liquid reflux, removing from said rectified absorption zone the fourth fraction of said gaseous mixture as a bottoms fraction containing constituents of highest molecular weight, introducing the uncondensed portion of said overhead fraction as a gaseous feed into a selective adsorption zone, contacting said feed therein with a moving bed of a solid granular adsorbent adsorbing thereby the more readily adsorbable constituents of intermediate and higher molecular weight contained in said feed, separating from said adsorption zone the first fraction of said gaseous mixture as an unadsorbed lean gas containing said constituents of said feed having the low molecular weight, separating from said adsorption zone the second fraction of said gaseous mixture as a side cut gas containing said constituents of said feed having the intermediate molecular weights, separating from said adsorption zone the third fraction of said gaseous mixture as a rich gas containing said constituents of higher molecular weight, returning a portion of said first fraction to said rectified absorption zone to act as said stripping gas, and liquefying a portion of said third fraction and combining it with said gaseous mixture as said liquid stream as above.

3. A continuous process according to claim 2 wherein said solid granular adsorbent comprises charcoal.

4. A continuous process for the separation of normally gaseous mixtures which contain thermally sensitive constituents of relatively low, intermediate, higher, and highest molecular weight which comprises contacting said gaseous mixture in an absorption zone with a cold liquid stream of constituents separated from said gaseous mixture and which have intermediate and higher molecular weights thereby cooling said gaseous mixture and forming an enriched feed containing constituents of intermediate and lower molecular weight and a rich solvent containing constituents of higher and highest molecular weight, combining a portion of said rich solvent with said enriched feed to form thereby a combined feed, introducing said combined feed into a rectified absorption zone, countercurrently contacting said combined feed therein with a stripping gas containing constituents of said gaseous mixture having the low molecular weights thereby removing from said combined feed said constituents having higher molecular weights, removing from said rectified absorption zone an overhead fraction comprising a gas containing constituents of said gaseous mixture of low, intermediate, and higher molecular weight, removing from said rectified absorption zone a bottoms fraction containing constituents of highest molecular weight, cooling and condensing a portion of said overhead fraction to form a condensed portion and an uncondensed portion, returning said condensed portion to said rectified absorption zone to serve therein as reflux, introducing said uncondensed portion as feed into a selective adsorption zone, contacting said feed therein with a moving bed of a solid granular adsorbent thereby adsorbing said constituents of said feed having intermediate and higher molecular weights to form a rich adsorbent and a substantially unadsorbed gas containing constituents of low molecular weight, removing said unadsorbed gas from said selective adsorption zone as a lean gas, contacting said rich adsorbent with a reflux stream containing constituents of said feed of higher molecular weight thereby desorbing the constituents of intermediate molecular weight, removing the desorbed intermediate molecular weight constituents from said selective adsorption zone as a side cut gas, heating the adsorbent containing the remaining constituents of said feed of higher molecular weight thereby desorbing said constituents to form a lean adsorbent and a rich gas, removing said rich gas from said selective adsorption zone, returning a portion of said lean gas to said rectified absorption zone to serve as said stripping gas therein, and returning a portion of said rich gas to said absorption zone to form therein said rich solvent.

5. A continuous process according to claim 4 wherein said solid granular adsorbent comprises charcoal.

6. A continuous process for the separation of normally gaseous hydrocarbons which contain thermally sensitive unsaturated hydrocarbons of relatively low, intermediate, higher, and highest molecular weight which comprises contacting said hydrocarbon mixtures in an absorption zone with a cold liquid stream of hydrocarbons of intermediate and higher molecular weight forming thereby an enriched feed and a rich solvent, removing from said absorption zone said rich solvent and said enriched feed combining a portion of said rich solvent with said enriched feed to form a combined feed, introducing said combined feed into a rectified absorption zone, heating the liquid containing hydrocarbons of intermediate, higher, and highest molecular weight flowing downwardly through said rectified absorption zone and countercurrently contacting said liquid with a stripping gas containing hydrocarbons of lower molecular weight, removing from said rectified absorption zone a bottoms fraction containing said thermally sensitive unsaturated hydrocarbons of highest molecular weight which fraction is substantially completely free of lower, intermediate, and higher molecular weight constituents, removing from said rectified absorption zone an overhead fraction comprising a gas containing constituents of low, intermediate and higher molecular weight, introducing a portion of said overhead fraction as feed into a selective adsorption zone, contacting said feed with a moving bed of a solid granular adsorbent thereby forming a rich adsorbent and a lean gas, removing said lean gas containing the lower and intermediate molecular weight hydrocarbons from said adsorption zone, contacting said rich adsorbent with a stripping gas thereby desorbing the hydrocarbons of higher molecular weight to form a rich gas, removing said rich gas from said selective adsorption zone, and returning a portion of said lean gas to said rectified absorption zone to serve as said stripping gas therein.

7. A continuous process according to claim 6 wherein solid granular adsorbent comprises charcoal and said stripping gas in said selective adsorption zone comprises steam.

8. A continuous process for the separation of hydrocarbon mixtures which contain saturated and unsaturated constituents having not more than about five carbon atoms per molecule together with hydrogen which comprises compressing said hydrocarbon mixture to a pressure between about 100 and 500 pounds per square inch absolute, introducing the thus compressed hydrocarbon mixture into an absorption zone, contacting therein said hydrocarbon mixture with a cold liquid stream comprising $C_3$ hydrocarbons thereby cooling said hydrocarbon mixture and forming an enriched feed containing hydrogen, $C_1$, $C_2$, and $C_3$ hydrocarbons, and a rich solvent containing $C_3$, thermally sensitive $C_4$ and $C_5$, and higher hydrocarbons, removing said rich solvent from said absorption zone, removing said enriched feed from said absorption zone, combining a portion of said rich solvent with said enriched feed to form a combined feed, introducing said combined feed into a rectified absorption zone, countercurrently contacting said combined feed therein with a liquid reflux containing predominantly $C_3$ hydrocarbons, removing a portion of the liquid flowing downwardly through said rectified absorption zone, heating the thus withdrawn liquid to a temperature less than 200° F. and returning the heated liquid to said rectified absorption zone, countercurrently contacting the heated liquid flowing downwardly through said rectified absorption zone with a stripping gas containing hydrogen and $C_1$ hydrocarbon thereby removing from said liquid the $C_2$ and $C_3$ hydrocarbons dissolved therein, removing from said rectified absorption zone a bottoms fraction containing predominantly said thermally sensitive unsaturated $C_4$ and $C_5$ hydrocarbons which is substantially completely free of $C_3$ and lower molecular weight hydrocarbons, removing from said rectified absorption zone an overhead fraction comprising hydrogen, $C_1$, $C_2$, and $C_3$ hydrocarbons, condensing a portion of the thus removed overhead fraction to form a condensed portion containing predominantly $C_3$ hydrocarbons together with some $C_2$ hydrocarbons and an uncondensed portion containing predominantly hydrogen, $C_1$ and $C_2$ hydrocarbons together with some $C_3$ hydrocarbons, returning at least a portion of said condensed portion to said rectified absorption zone to serve as reflux therein, introducing said uncondensed portion as feed into a selective adsorption zone, contacting therein said feed with a moving bed of activated charcoal thereby adsorbing the $C_3$ and $C_2$ hydrocarbons together with small amounts of $C_1$ hydrocarbon and hydrogen to form a rich charcoal and a lean gas containing predominantly hydrogen and $C_1$ hydrocarbon as a substantially unadsorbed gas, removing from said adsorption zone said lean gas, contacting said rich charcoal with a gas containing substantial quantities of $C_2$ hydrocarbons thereby desorbing the small amount of adsorbed $C_1$ hydrocarbon and hydrogen to form a rectified rich charcoal, contacting the rectified rich charcoal with a gas containing substantial quantities of $C_3$ hydrocarbons thereby desorbing from said rectified rich charcoal substantial quantities of $C_2$ hydrocarbons as a side cut gas thereby forming a rich charcoal containing predominantly $C_3$ hydrocarbons, removing said side cut gas from said adsorption zone, heating said rich charcoal containing adsorbed $C_3$ hydrocarbons and contacting said rich charcoal with steam thereby desorbing said $C_3$ hydrocarbons to form a rich gas and a lean charcoal, removing said rich gas from said selective adsorption zone, cooling and condensing said rich gas to form a stream of liquid $C_3$ hydrocarbons, returning a portion of said liquid $C_3$ hydrocarbons to said absorption zone, and returning a portion of said lean gas to said rectified absorption zone to serve therein as said stripping gas.

9. An apparatus for the continuous separation of a normally gaseous mixture containing constituents which are thermally sensitive which comprises a vertical absorption column, means within said absorption column for contacting a vapor and a liquid, means for introducing said normally gaseous mixture, means for removing an enriched feed from the upper portion of said absorption column, means for removing a rich solvent from the lower portion, means for introducing a liquid reflux into the upper portion of said absorption column, means for combining said enriched feed with a portion of said rich solvent to form a combined feed, a vertical rectified absorption column, means for introducing said combined feed into the central part of said rectified absorption column, means within said rectified absorption column for contacting said combined feed with a liquid and vapor, means for removing an overhead fraction from the upper part of said rectified absorption column, means for cooling and condensing a portion of said overhead fraction, means for returning the condensate thus formed to the upper part of said rectified absorption column as reflux, means for removing a bottoms fraction from the lower part of said rectified absorption column, and means for introducing a part of said uncondensed portion of said overhead fraction into the lower part of said rectified absorption column to serve as a stripping gas.

10. An apparatus for the continuous separation of normally gaseous mixtures containing thermally sensitive constituents which comprises a vertical absorption column, a vertical rectified absorption column, and a vertical selective adsorption column, means in said absorption column and in said rectified absorption column for contacting liquids and vapors, means for introducing said gaseous mixture into the lower part of said absorption column, means for introducing a liquid reflux into the upper portion of said absorption column, means for removing an enriched feed from the upper part of said absorption column, means for removing a rich solvent from the lower part of said absorption column, means for combining a portion of said rich solvent with said liquid reflux which is introduced into the upper part of said absorption column, means for combining the remaining portion of said rich solvent with said enriched feed to form a combined feed, means for introducing said combined feed into the central part of said rectified absorption column, means for removing an overhead fraction from the upper part of said rectified absorption zone, means for cooling and condensing a portion of said overhead fraction, means for returning the thus condensed portion of said overhead fraction as reflux to the upper part of said rectified absorption column, means for removing a bottoms fraction from the lower part of said rectified absorption column, means for introducing the uncondensed portion of said overhead fraction into said selective adsorption column, means for maintaining a continuous downward flow of a solid granular adsorbent through said selective adsorption column, means for removing a lean gas from said selective adsorption column, means for removing a side cut gas from said selective adsorption column, means for removing a rich gas from said selective adsorption column, means for returning a portion of said lean gas to the lower part of said rectified absorption column, means for cooling and condensing said rich gas, and means for returning at least a portion of the thus condensed rich gas to said absorption column to serve therein as liquid reflux.

11. An apparatus for the continuous separation of normally gaseous mixtures which comprises a vertical absorption column, a vertical rectified absorption column, and a vertical selective adsorption column, means for compressing said gaseous mixture, means for cooling said gaseous mixture during compression, means for separating a condensate from the compressed gaseous mixture thus formed, means for cooling the compressed gaseous mixture so as to form additional condensate, means for introducing the compressed gaseous mixture into the lower portion of said absorption column, means within absorption column for contacting vapors and liquids, means for introducing a liquid reflux into said absorption column, means for removing an enriched feed from the upper portion of said absorption column, means for removing a rich solvent from the lower portion of said adsorption column, means for combining said condensate with said enriched feed and a portion of said rich solvent to form a combined feed, means for introducing said combined feed into the central portion of said rectified absorption column, means within said absorption column for contacting liquids and vapors, means for removing an overhead fraction from the upper part of said rectified absorption column, means for cooling and condensing a portion of said overhead fraction, means for separating the condensed and uncondensed portions of said overhead fraction, means for returning at least a portion of the condensed portion of said overhead fraction to the upper part of said rectified absorption column to serve therein as reflux, means for removing a bottoms fraction from the lower part of said rectified absorption column, means in the lower portion of said rectified absorption column for introducing a stripping gas, means for introducing the uncondensed portion of said overhead fraction into said selective adsorption column, means for maintaining a continuous downward flow of a solid granular adsorbent through said selective adsorption column, means for removing a lean gas from said selective adsorption column, means for removing a rich gas from said selective adsorption column, means for returning a portion of said lean gas to the lower portion of said rectified absorption column to serve therein as said stripping gas, means for cooling and condensing said rich gas, means for returning a portion of said condensed rich gas to the upper portion of said absorption column to serve therein as said liquid reflux, and means for returning another portion of said condensed rich gas to be combined with said enriched feed and introduced into said rectified absorption column.

12. An apparatus for the continuous separation of normally gaseous mixtures which comprises a vertical absorption column, a vertical rectified absorption column, and a vertical selective adsorption column, multistage compressor means for increasing the pressure of said gaseous mixture to form a compressed gaseous mixture, cooling means between the individual stages of said compressor, means for separating the condensate formed in said cooling means, interchanger means for cooling the compressed gaseous mixture by indirect heat exchange with the feed to said selective adsorption column thereby cooling said compressed gaseous mixture and forming further condensate, means for separating said condensate from the cooled gaseous mixture, means for introducing the cooled compressed gaseous mixture into the lower portion of said absorption column, means for removing a rich solvent from the lower portion of said absorption column, means for heating the thus withdrawn rich solvent by further indirect heat interchanger with the feed to said selective adsorption column, means for introducing a portion of the thus heated rich solvent into the upper portion of said absorption column serving therein to cool the gaseous mixture introduced thereinto and removing therefrom the thermally sensitive constituents contained therein, means for removing an enriched feed from the upper portion of said absorption column, means for combining said enriched feed with said condensates and a portion of said rich solvent to form a combined feed, means for introducing said combined feed into said rectified absorption column, means within said rectified absorption column for contacting said combined feed with a liquid reflux, means for supplying heat to said rectified absorption column, means for introducing a stripping gas into the lower portion of said rectified absorption column, means for removing a bottoms fraction from the lower portion of said rectified absorption column, means for removing an overhead fraction from the upper portion of said rectified absorption column, means for cooling and condensing at least a portion of said overhead fraction, means for separating the uncondensed portion from the condensed portion of said overhead fraction, means for returning at least a portion of said condensed portion to the upper part of said rectified absorption column to serve therein as reflux, means for introducing the uncondensed portion into said selective adsorption column, means for maintaining a continuous downward flow of activated charcoal through said selective adsorption column, means for controlling the rate of charcoal flow, means for withdrawing charcoal from the lower portion of said selective adsorption column, means for suspending the thus withdrawn charcoal in a lift gas, means for transporting the thus formed charcoal suspension to the upper portion of said selective adsorption column, means within said selective adsorption column for heating and cooling said charcoal, means for withdrawing from said adsorption column a lean gas comprising those constituents of said gaseous mixture having the lower molecular weight, means for returning a portion of said lean gas to the lower portion of said rectified absorption column to serve therein as said stripping gas, means for removing from said selective adsorption column a rich gas comprising the constituents of said gaseous mixture having higher molecular weights, means for cooling and condensing said rich gas, and means for returning a portion of the thus condensed rich gas to the upper portion of said absorption column to serve therein as liquid reflux.

13. A process for the separation of normally gaseous mixtures which contain thermally sensitive constituents to obtain a first fraction of lowest critical temperature, a second fraction of intermediate critical temperature, and a third fraction of highest critical temperature, which comprises mixing said gaseous mixture with a portion of said second fraction to form a combined feed, introducing the combined feed into the middle of a vertical absorption zone, introducing a portion of said first fraction as a stripping gas into the lower portion of said absorption zone, withdrawing said third fraction from the bottom of said absorption zone, withdrawing a gaseous overhead fraction from the top of said absorption zone, condensing a portion of said overhead fraction, returning the condensed portion of said overhead fraction to the upper part of said absorption zone as an absorption oil reflux, and separating the uncondensed portion of said overhead fraction to form said first fraction and said second fraction.

14. A continuous process for the separation of normally gaseous mixtures which contain thermally sensitive constituents to form a first fraction of lowest critical temperature, a second fraction of intermediate critical temperature, a third fraction of higher critical temperature, and a fourth fraction of highest critical temperature, which comprises mixing said gaseous mixture with a portion of said third fraction to form a combined feed, introducing said combined feed into the middle of a vertical absorption zone, introducing a portion of said first fraction into the lower portion of said absorption zone as a stripping gas, withdrawing said fourth fraction from the bottom of said absorption zone, withdrawing a gaseous overhead from the top of said absorption zone, condensing a portion of said overhead fraction, returning the condensed portion of said overhead fraction to the upper portion of said absorption zone as a liquid absorption oil reflux, withdrawing a portion of the liquid from the middle of the absorption zone, heating it to a temperature not in excess of 200° F. and returning it to the middle of the absorption zone, and separating the uncondensed portion of said overhead fraction to obtain said first, second and third fractions.

CLYDE H. O. BERG.

REFERENCES CITED

The following references are of record in the file of this patent:

UNITED STATES PATENTS

| Number | Name | Date |
|---|---|---|
| 1,225,226 | Doherty | May 8, 1917 |
| 1,422,007 | Soddy | July 4, 1922 |
| 1,957,818 | Carney | May 8, 1934 |
| 2,070,099 | Twomey | Feb. 9, 1937 |
| 2,095,578 | Theiler | Oct. 12, 1937 |
| 2,111,822 | Sullivan | Mar. 22, 1938 |
| 2,222,276 | Babcock | Nov. 19, 1940 |
| 2,230,219 | Carey | Feb. 4, 1941 |
| 2,355,589 | Brandt | Aug. 8, 1944 |
| 2,377,736 | White | June 5, 1945 |
| 2,384,311 | Kearby | Sept. 4, 1945 |

Certificate of Correction

Patent No. 2,519,344                                   August 22, 1950

CLYDE H. O. BERG

It is hereby certified that error appears in the printed specification of the above numbered patent requiring correction as follows:

Column 8, line 52, for "separator 60" read *separator 69*; column 14, line 57, for the word "above" read *about*;

and that the said Letters Patent should be read as corrected above, so that the same may conform to the record of the case in the Patent Office.

Signed and sealed this 14th day of November, A. D. 1950.

[SEAL]

THOMAS F. MURPHY,
*Assistant Commissioner of Patents.*